(12) United States Patent
Stotts et al.

(10) Patent No.: US 9,659,011 B1
(45) Date of Patent: *May 23, 2017

(54) METHOD AND SYSTEM FOR INTERFACE PRESENTATION

(75) Inventors: Benjamin Hunter Stotts, Spring Branch, TX (US); Bradly Jay Billman, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 739 days.

This patent is subject to a terminal disclaimer.

(21) Appl. No.: 12/032,941

(22) Filed: Feb. 18, 2008

(51) Int. Cl.
*G06F 17/30* (2006.01)

(52) U.S. Cl.
CPC ...... *G06F 17/30* (2013.01); *G06F 2221/2117* (2013.01); *G06F 2221/2141* (2013.01)

(58) Field of Classification Search
CPC ............. G06F 2221/2141; G06F 17/30; G06F 2221/2117
USPC ......... 707/716, 721, 781, 732, 784; 715/200
See application file for complete search history.

(56) References Cited

U.S. PATENT DOCUMENTS

| | | | | |
|---|---|---|---|---|
| 6,850,252 B1* | 2/2005 | Hoffberg | ....................... | 715/716 |
| 7,644,367 B2* | 1/2010 | McKeon | ............. | H04N 21/241 |
| | | | | 715/747 |
| 8,042,061 B1* | 10/2011 | Stotts | .................... | G06F 21/629 |
| | | | | 715/714 |
| 8,201,230 B2* | 6/2012 | Day | ........................ | G06F 21/62 |
| | | | | 382/115 |
| 8,244,744 B1* | 8/2012 | Emigh | ................. | G06Q 10/109 |
| | | | | 707/756 |
| 8,479,102 B2* | 7/2013 | Son | ....................... | G06F 9/4443 |
| | | | | 715/744 |
| 8,615,529 B2* | 12/2013 | Reiner | ................... | A61B 5/411 |
| | | | | 707/687 |
| 8,768,965 B2* | 7/2014 | Kimball | ................ | G06F 3/0481 |
| | | | | 707/784 |
| 2002/0068500 A1 | 6/2002 | Gabai et al. | | |
| 2002/0120474 A1 | 8/2002 | Hele et al. | | |
| 2002/0174073 A1* | 11/2002 | Nordman | ............. | G06Q 20/382 |
| | | | | 705/64 |
| 2005/0028008 A1* | 2/2005 | Kumar | ................ | G06F 21/6227 |
| | | | | 726/2 |
| 2005/0054381 A1* | 3/2005 | Lee | ......................... | G06F 3/011 |
| | | | | 455/557 |
| 2005/0138373 A1* | 6/2005 | Clark | ...................... | G06F 21/31 |
| | | | | 713/166 |
| 2005/0278386 A1* | 12/2005 | Kelly | ................ | G06F 17/30241 |
| 2006/0053389 A1* | 3/2006 | Michelman | .......... | G06F 9/4443 |
| | | | | 715/775 |
| 2006/0074883 A1 | 4/2006 | Teevan et al. | | |
| 2006/0173556 A1* | 8/2006 | Rosenberg | ........ | G06F 17/30867 |
| | | | | 700/3 |

(Continued)

*Primary Examiner* — Robert Beausoliel, Jr.
*Assistant Examiner* — Alexandria Bromell
(74) *Attorney, Agent, or Firm* — Baker & Hostetler LLP

(57) ABSTRACT

Methods and systems for interface presentation are described. A user interface for the user may be selected among a plurality of available user interfaces in accordance with the personal characteristic information. A user access profile level for the user may be selected among a plurality of available user access profile levels in accordance with the personal characteristic information. Product information may be selected in accordance with the age data.

15 Claims, 13 Drawing Sheets

(56) References Cited

U.S. PATENT DOCUMENTS

| | | |
|---|---|---|
| 2006/0184800 A1 | 8/2006 | Rosenberg |
| 2006/0190809 A1 | 8/2006 | Hejna |
| 2006/0235738 A1* | 10/2006 | Doyle .............. G06Q 10/06311 705/7.15 |
| 2007/0070038 A1 | 3/2007 | Hoffberg et al. |
| 2007/0265926 A1* | 11/2007 | Ohmann et al. ................ 705/26 |
| 2008/0134344 A1* | 6/2008 | McBrearty .......... G06F 21/6245 726/28 |
| 2010/0198820 A1* | 8/2010 | Work ..................... G06Q 10/10 707/723 |
| 2011/0173701 A1* | 7/2011 | Raley ...................... G06F 21/10 726/26 |
| 2013/0124560 A1* | 5/2013 | O'Sullivan ......... G06F 17/3087 707/769 |

\* cited by examiner

METHOD AND SYSTEM FOR INTERFACE PRESENTATION

CROSS REFERENCES

This application is related to U.S. application Ser. No. 12/032,935, titled "METHOD AND SYSTEM FOR INTERFACE PRESENTATION" filed on Feb. 18, 2008, now U.S. Pat. No. 8,042,061; and to U.S. application Ser. No. 12/032,943, titled "METHOD AND SYSTEM FOR INTERFACE PRESENTATION" filed on Feb. 18, 62008, now U.S. Pat. No. 7,827,072.

FIELD

This application relates to a method and system for interfaces, and more specifically to methods and systems for interface presentation.

BACKGROUND

Interfaces are provided to enable users to access local or remote content. Users may interact through the user interface with a provider of the user interface. The interfaces may be preselected for the user.

SUMMARY

In an example embodiment, personal characteristic information of a user may be accessed. A user interface for the user may be selected among a plurality of available user interfaces in accordance with the personal characteristic information. The selected user interface may be presented to the user.

In an example embodiment, personal characteristic information of a user may be determined. A user access profile level for the user may be selected among a plurality of available user access profile levels in accordance with the personal characteristic information. An application interface to an application may be selected in accordance with the user access profile level. The application interface may be presented to the user.

In an example embodiment, age data associated with a user may be accessed from a database in a system. Product information may be selected in accordance with the age data. The product information may describe a product available to the user in the system. The product information may be presented to the user.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for interface presentation are described. In the following description, for purposes of explanation, numerous specific details are set forth in order to provide a thorough understanding of example embodiments. It will be evident, however, to one skilled in the art that the present invention may be practiced without these specific details.

Figure 1:
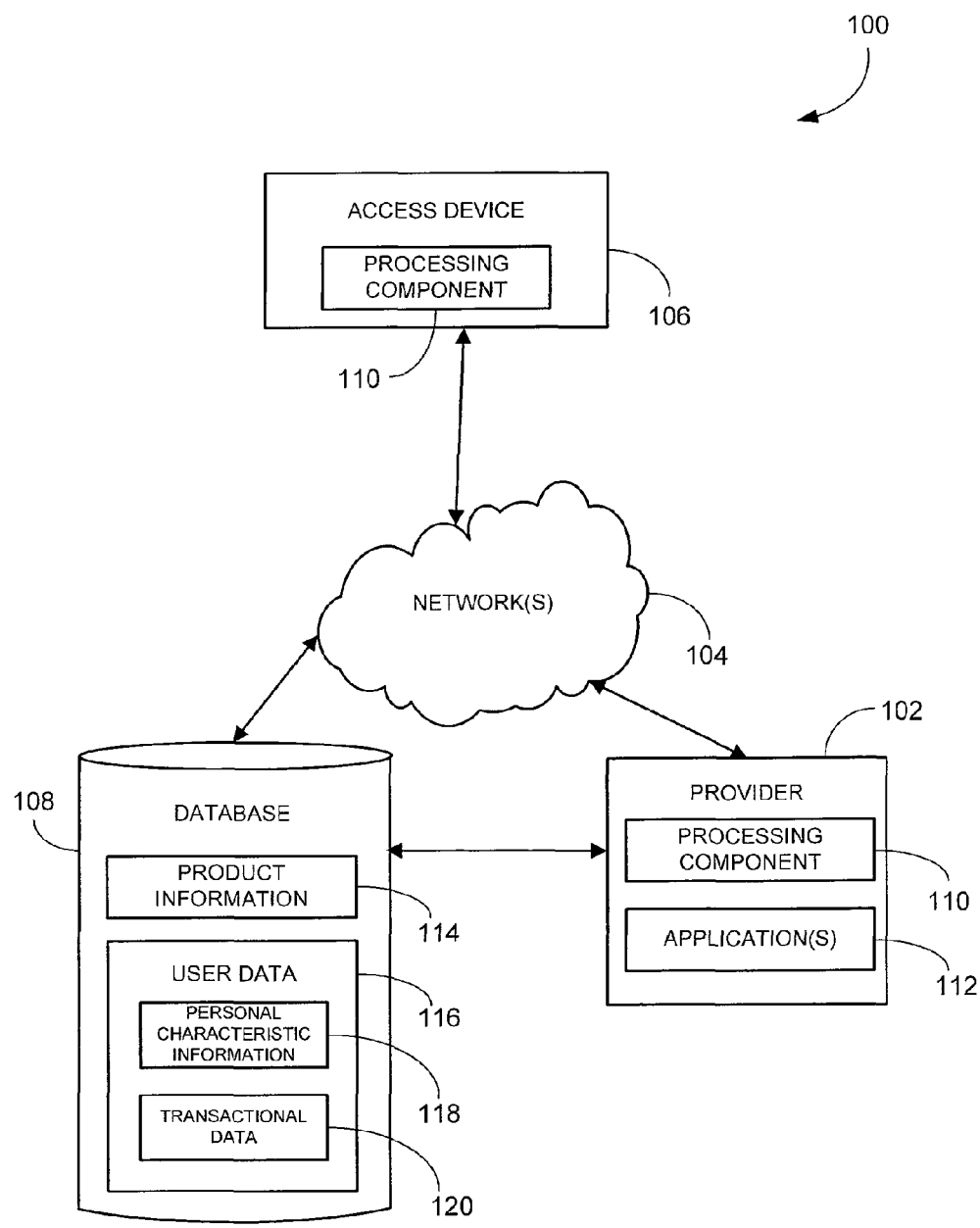
FIGS. 1 and 2 are block diagrams of an example content system according to an example embodiment.

FIG. 1 illustrates an example content system 100 in which a provider 102 may be in communication over a network 104 with an access device 106. The provider 102 may be in a client server relationship, peer-to-peer relationship, or another type of relationship with the access device 106.

The provider 102 may provide content and access to functionality available through the provider 102. For example, the provider may provide product information 114 and/or access to functionality provided by one or more applications 112 running on the provider 102 or otherwise available through the provider 102.

The network 104 over which the provider 102 and the access device 106 are in communication may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The access device 106 may send requests and other information over the network 104 to the provider 102. Examples of the access device 106 include a set-top box (STB), a receiver card, a mobile telephone, a personal digital assistant (PDA), a MP3 player, and a computing system; however other devices may also be used.

One or more processing components 110 may provide one or more interfaces and/or other information to a user through the access device 106. The provider 102 and/or the access device 106 may include the one or more processing components 110. An example embodiment of the processing components 110 are described in greater detail below.

The processing components 110 may use the product information 114 and/or user data 116 stored in a database 108 in determining one or more interfaces and/or other information to provide to the user. The product information 114 may describe a product available to the user of the content system 100, 200. The product may be offered by or through the provider 102 and include, by way of example, life insurance, health insurance, car insurance, a credit card, a savings account, a checking account, or the like.

The user data may include personal characteristic information 118 and/or transactional data 120. The personal characteristic information 118 may include, by way of example, age data, rank data, gender data, address data, job data, income data, family data, and/or a user level. Other types of information may also be used.

The transactional data 120 may relate to transactions of the user involving the provider 102 or others. For example, the transactional data 120 may include information regarding a purchase made by a user on a particular day.

Figure 2:
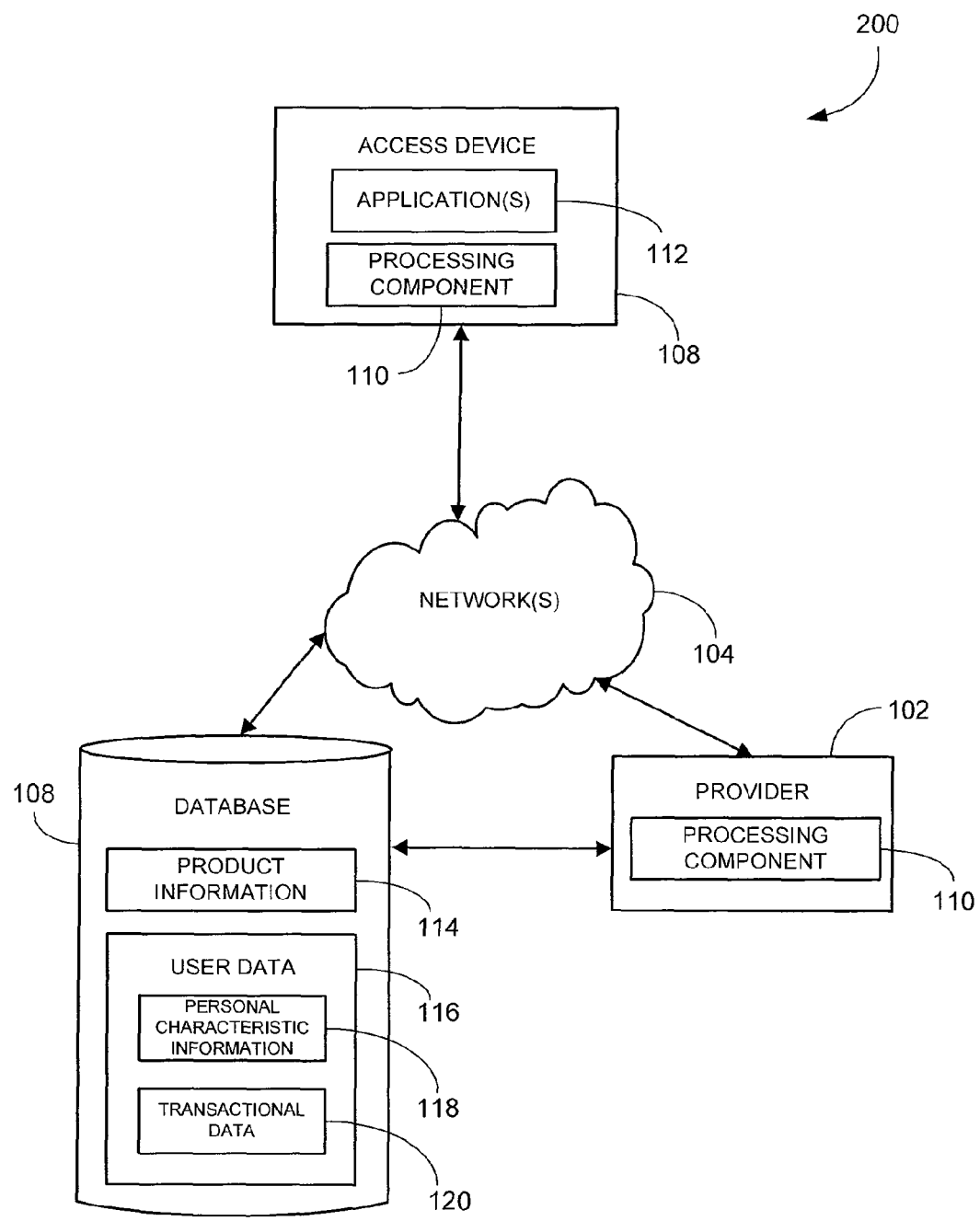

FIG. 2 illustrates an example content system 200. The content system 200 may include components of the content system 100 but the application 112 may be running client-side on the access device 108 instead of server-side on the provider 102.

Figure 3:
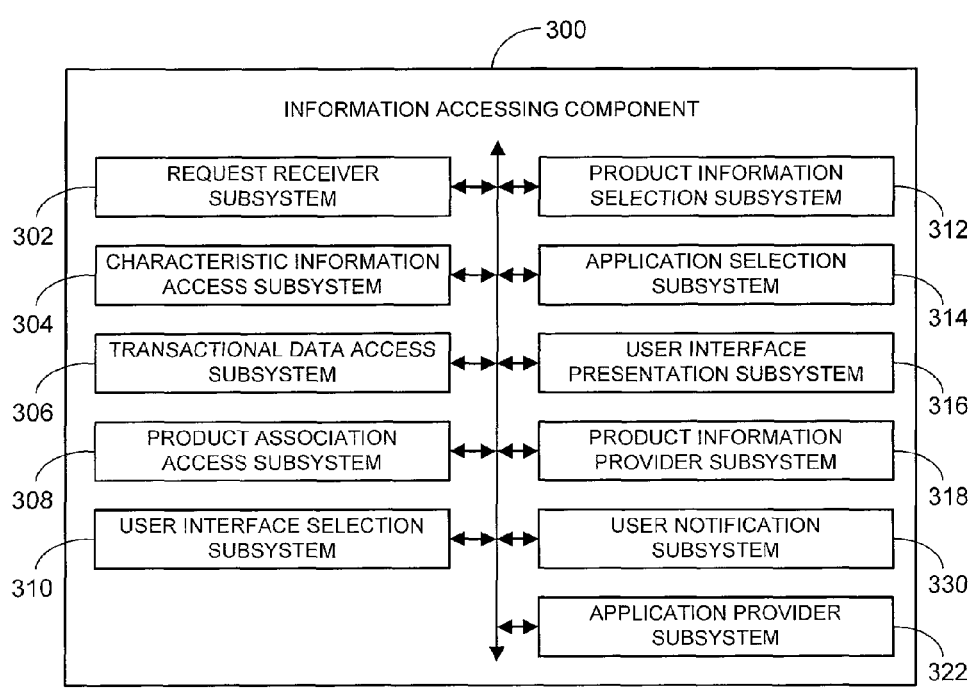
FIG. 3 is a block diagram of an example information accessing component that may be deployed in the content system of FIG. 1 or 2 according to an example embodiment.

FIG. 3 illustrates an example information accessing component 300 that may be deployed in the provider 102 and/or the access device 106 of the content system 100, 200 as the processing component 110 or otherwise deployed in another system.

The information accessing component 300 may include a request receiver subsystem 302, a characteristic information access subsystem 304, a transactional data access subsystem 306, the product association access subsystem 308, a user interface selection subsystem 310, a product information selection subsystem 312, an application selection subsystem 314, a user interface presentation subsystem 316, a product information provider subsystem 318, a user notification subsystem 230, and/or the application provider subsystem 322. Other subsystems may also be used.

The request receiver subsystem 302 receives an application request and/or a login request from the user. The request may be received through a user interface presented on the access device 106 or otherwise received.

The characteristic information access subsystem 304 accesses the personal characteristic information 118 of a user. The personal characteristic information 118 may be accessed from the database 108 or otherwise accessed. The personal characteristic information may be accessed in response to the receipt of a login request by the request receiver subsystem 302.

The transactional data access subsystem 306 accesses the transactional data 120 associated with the user. The transactional data 120 may be accessed from the database 108 or otherwise accessed.

The product association access subsystem 308 accesses product association information of the user. The product association may be accessed from the user data 116 in the database 108 or otherwise accessed.

The user interface selection subsystem 310 selects a user interface for the user among available user interfaces in accordance with the personal characteristic information 118 received from the characteristic information access subsystem 304, the transactional data 120 received from the transactional data access subsystem 306, and/or the product association information received from the product association access subsystem 308. The available user interfaces may include different interface formats, different interface layouts, different interface color schemes, and/or different functionality available through the available user interfaces.

The product information selection subsystem 312 selects the product information 114 for the user in accordance with the personal characteristic information 118 received from the characteristic information access subsystem 304.

The application selection subsystem 314 selects the application 112 for the user in accordance with the personal characteristic information 118 received from the characteristic information access subsystem 304.

The user interface presentation subsystem 316 presents the user interface to the user (e.g., on the access device 106) as selected by the user interface selection subsystem 310. The product information provider subsystem 318 provides the product information 114 to the user through the user interface as selected by the product information selection subsystem 312.

The user notification subsystem 320 notifies the user of availability of the application 112 in accordance with the application selection by the application selection subsystem 314. The application provider subsystem 322 provides the application request received by the request receiver subsystem 302 to the application 112.

Figure 4:
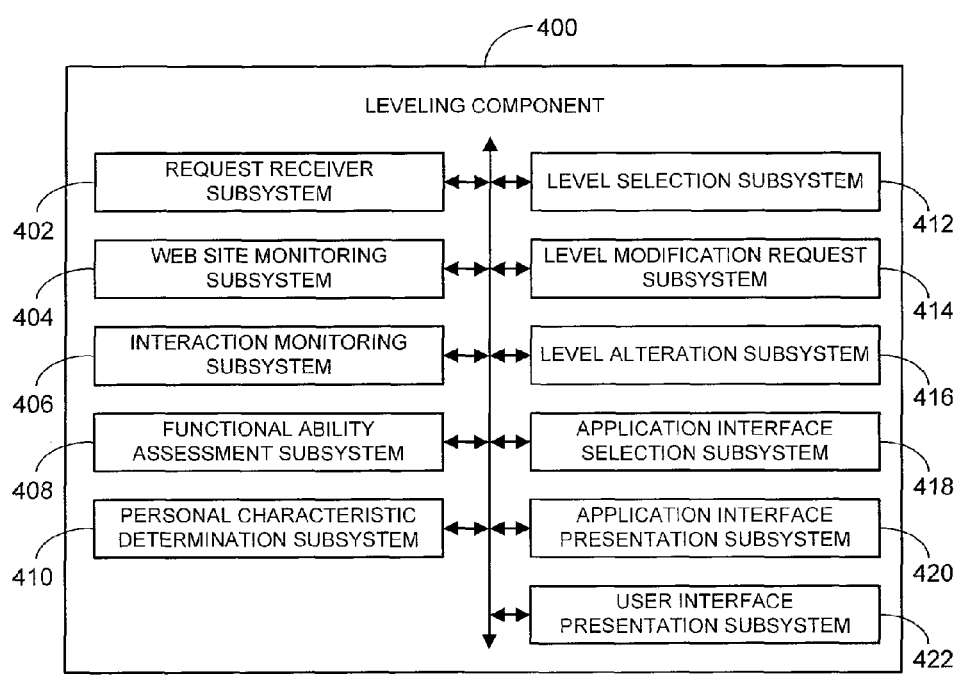
FIG. 4 is a block diagram of an example leveling component that may be deployed in the content system of FIG. 1 or 2 according to an example embodiment.

FIG. 4 illustrates an example leveling component 400 that may be deployed in the provider 102 and/or the access device 106 of the content system 100, 200 as the processing component 110 or otherwise deployed in another system.

The leveling component 400 may include a request receiver subsystem 402, a web site monitoring subsystem 404, an interaction monitoring subsystem 406, a functional ability assessment subsystem 408, a personal characteristic determination subsystem 410, a level selection subsystem 412, a level modification request subsystem 414, a level alteration subsystem 416, an application interface selection subsystem 418, an application interface presentation subsystem 420, and/or an user interface presentation subsystem 422. Other subsystems may also be used.

The request receiver subsystem 402 receives a request for the application. The request may be received through a user interface presented on the access device 106 or otherwise received.

The web site monitoring subsystem 404 monitors a number of web sites visited by the user. The interaction monitoring subsystem 406 monitors a number of interactions and/or additional interactions received from the user.

The functional ability assessment subsystem 408 assesses a functional ability of the user to utilize the application 112 through the application interface. The functional ability may include, by way of example, a speed of use of the application 112 by the user through the application interface, a comprehension of a number of features of the application 112 available to the user through the application interface, and the like.

The personal characteristic determination subsystem 410 determines the personal characteristic information 118 of a user. The determining of the personal characteristic information 118 may be in accordance with the receiving of the request by the request receiver subsystem 402. The personal characteristic information 118 may be determined by accessing the personal characteristic information 118 of the user from the database 108. The number of web sites visited by the user and/or the number of interactions received by the user may be used by the personal characteristic determination subsystem 410 to determine the personal characteristic information 118.

The level selection subsystem 412 selects a user access profile level for the user among available user access profile levels in accordance with the personal characteristic information as determined by the personal characteristic determination subsystem 410.

The level modification request subsystem 414 receives an access profile level modification request from the user. The access profile level modification request may be received through a user interface presented on the access device 106 or otherwise received.

The level alteration subsystem 416 alters the user access profile level for the user in accordance with the monitoring of the number of additional interactions by the interaction monitoring subsystem 406, monitoring of the number of web sites visited by the user by the web site monitoring subsystem 404, the receiving of the access profile level modification request by the level modification request subsystem 414 and/or the functional ability of the user as assessed by the functional ability assessment subsystem 408.

The application interface selection subsystem 418 selects an application interface to the application 112 in accordance with the user access profile level, a replacement application interface to the application 112 in accordance with the altered user access profile level, and/or an additional application interface to an additional application 112 in accordance with the altered user access profile level.

The application interface presentation subsystem 420 presents the application interface, the replacement application interface, or the additional application interface to the user.

The user interface presentation subsystem 422 presents a user interface to the user. The application interface presented by the application interface presentation subsystem 420 may be presented to the user within the user interface of the access device 106.

Figure 5:
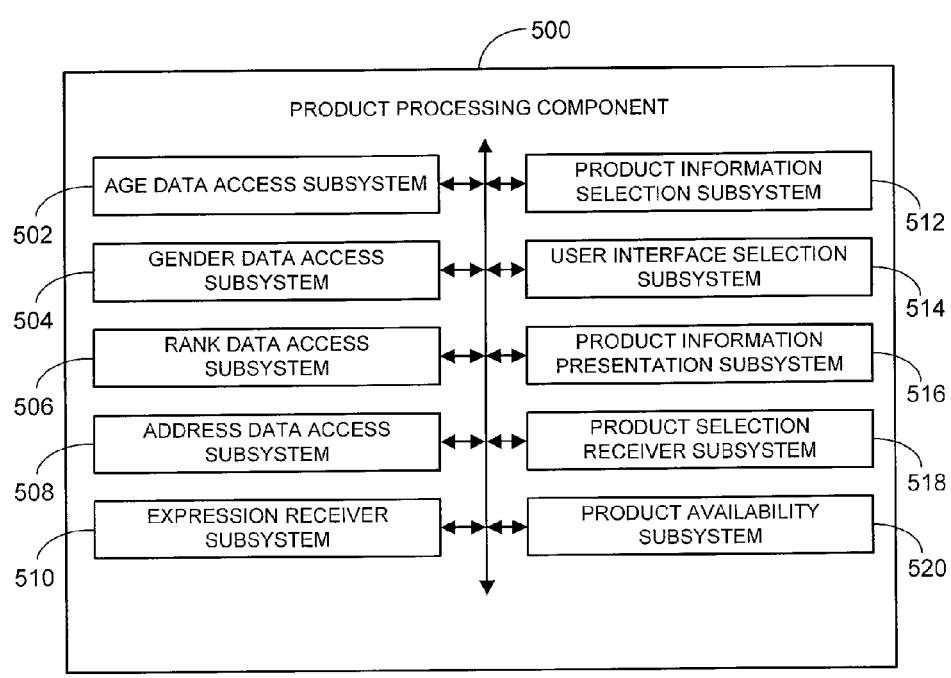
FIG. 5 is a block diagram of an example product processing component that may be deployed in the content system of FIG. 1 or 2 according to an example embodiment.

FIG. 5 illustrates an example product processing component 500 that may be deployed in the provider 102 and/or the access device 106 of the content system 100, 200 as the processing component 110 or otherwise deployed in another system.

The product processing component 500 may include an age data access subsystem 502, a gender data access subsystem 504, a rank data access subsystem 506, an address data access subsystem 508, an expression receiver subsystem 510, a product information selection subsystem 512, a user interface selection subsystem 514, a product information presentation subsystem 516, a product selection receiver subsystem 518, and/or a product availability subsystem 520. Other subsystems may also be used.

The age data access subsystem 502 accesses age data from the personal characteristic information 118 associated with a user from the database 108. The gender data access subsystem 504 accesses gender data from the personal characteristic information 118 associated with the user. The rank data access subsystem 506 accesses rank data from the personal characteristic information 118 associated with the user. The address data access subsystem 508 accesses address data from the personal characteristic information 118 associated with the user. The expression receiver subsystem 510 receives an expression of product interest from the user.

The product information selection subsystem 512 selects the product information 114 in accordance with the age data, the gender data, the rank data, the address data, and/or an expression of product interest.

The user interface selection subsystem 514 selects a user interface for the user among a number of available user interfaces in accordance with the age data, the gender data, the rank data, the address data, and/or an expression of product interest.

The product information presentation subsystem 516 presents the product information selected by the product information selection subsystem 512 to the user. The product information may be presented to the user through the selected user interface.

The product selection receiver subsystem 518 receives a product selection from the user. The product selection may be of the product associated with the product information. The product availability subsystem 520 makes the product available in the content system 100, 200 to the user in accordance with the receiving of the product selection by the product selection receiver subsystem 518.

Figure 6:
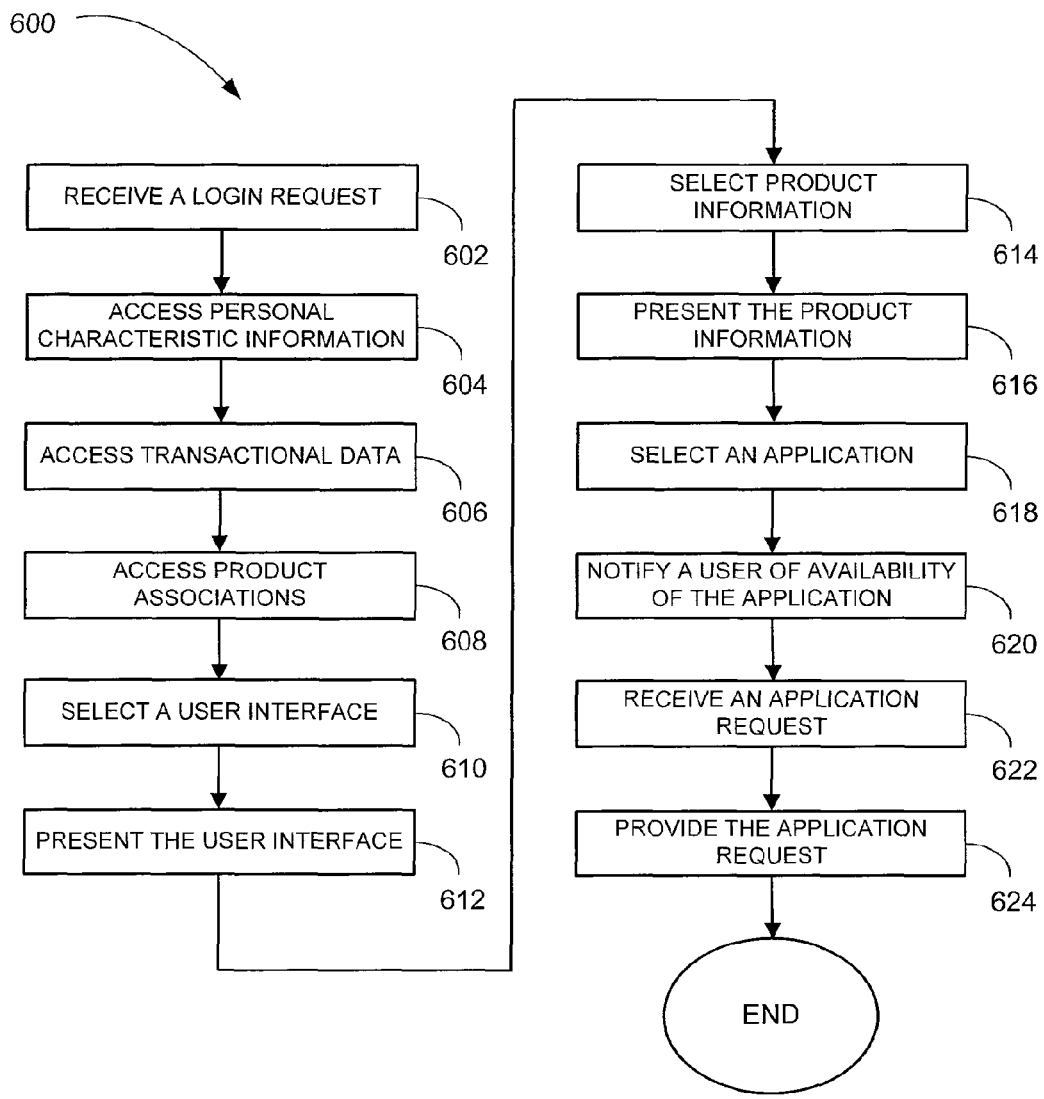
FIG. 6 is a flowchart illustrating a method for user interface presentation in accordance with an example embodiment.

FIG. 6 illustrates a method 600 for user interface presentation according to an example embodiment. The method 600 may be performed by the provider 102 and/or the access device 106 of the content system 100, 200 (see FIGS. 1 and 2) or otherwise performed.

A login request may be received from a user at block 602.

The personal characteristic information 118 of a user is accessed at block 604. The personal characteristic information 118 of the user may be accessed from the database 108 or otherwise accessed. The accessing of the personal characteristic information may be in response to receiving the login request.

The transactional data 120 associated with the user may be accessed at block 606. The transactional data 120 associated with the user may be accessed from the database 108 or otherwise accessed.

Existing products associated with the user may be accessed at block 608.

At block 610, a user interface is selected for the user among a number of available user interfaces in accordance with the personal characteristic information 118, the product associations, and/or the transactional data 120. The available user interfaces may include different interface formats, different interface layouts, different interface color schemes, different functionality available through the available user interfaces, and the like.

The selected user interface is presented to the user at block 612. The selected user interface may be presented on the access device 106 or otherwise presented.

The product information 114 may be selected for the user in accordance with the personal characteristic information 118 at block 614. The product information 114 may be presented to the user through the user interface at block 616.

A particular application 112 may be selected for the user in accordance with the personal characteristic information 118 at block 618.

The user may be notified of availability of the application 112 at block 620.

An application request may be received from the user at block 622. The application request may be provided to the application 112 at block 624. The application request may, by way of example, unlock functionality of the application 112, the application 112 may be provided to the access device 106, or the like.

Figure 7:
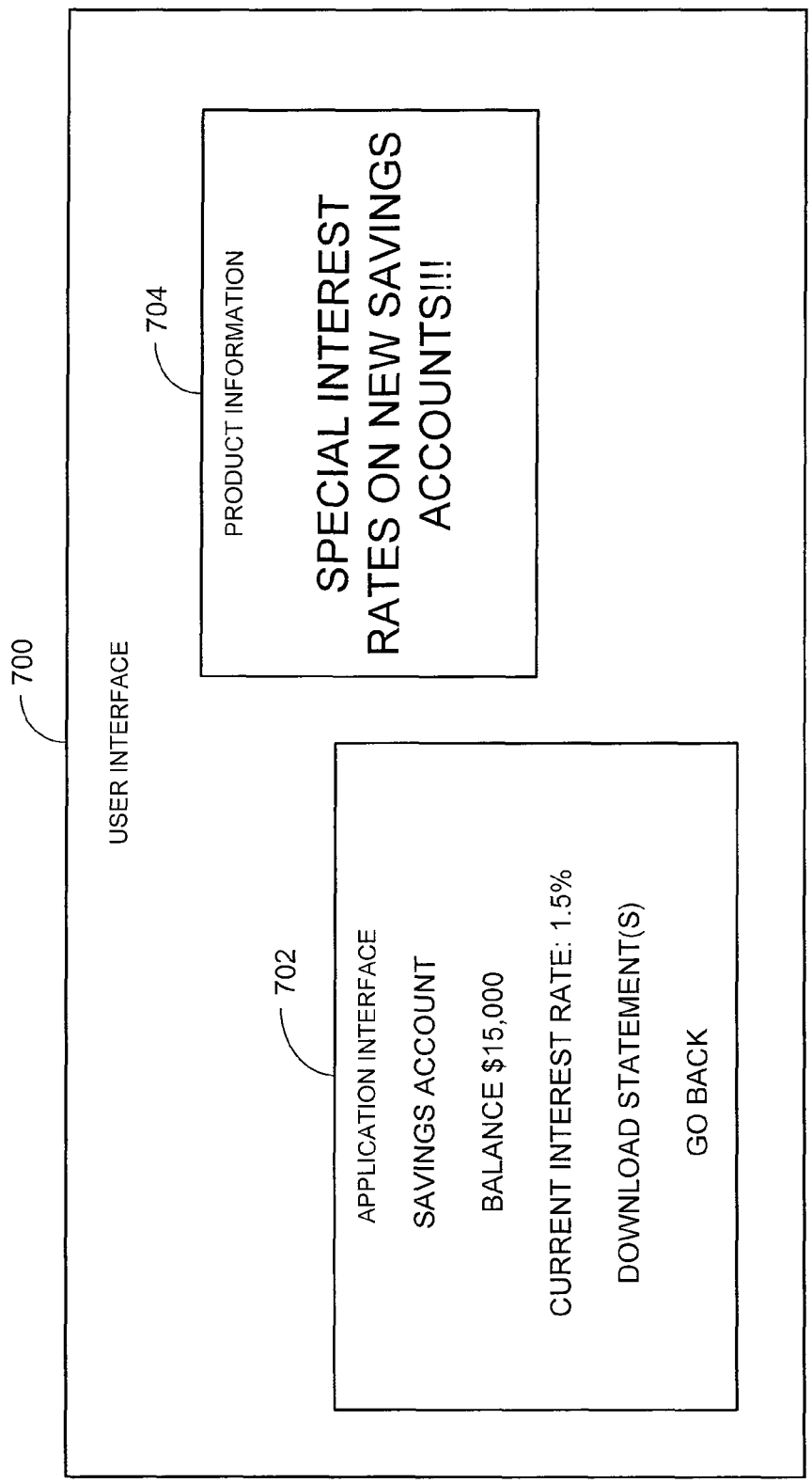
FIG. 7 is a is a block diagram of an example user interface in accordance with an example embodiment.

FIG. 7 is a block diagram of an example user interface 700 that may be provided to a user of the content system 100, 200 (see FIGS. 1 and 2). An application interface 702 for an application may be presented to the user within the user interface 700. Product information 704 may also be presented to the user within the user interface 700.

Figure 8:
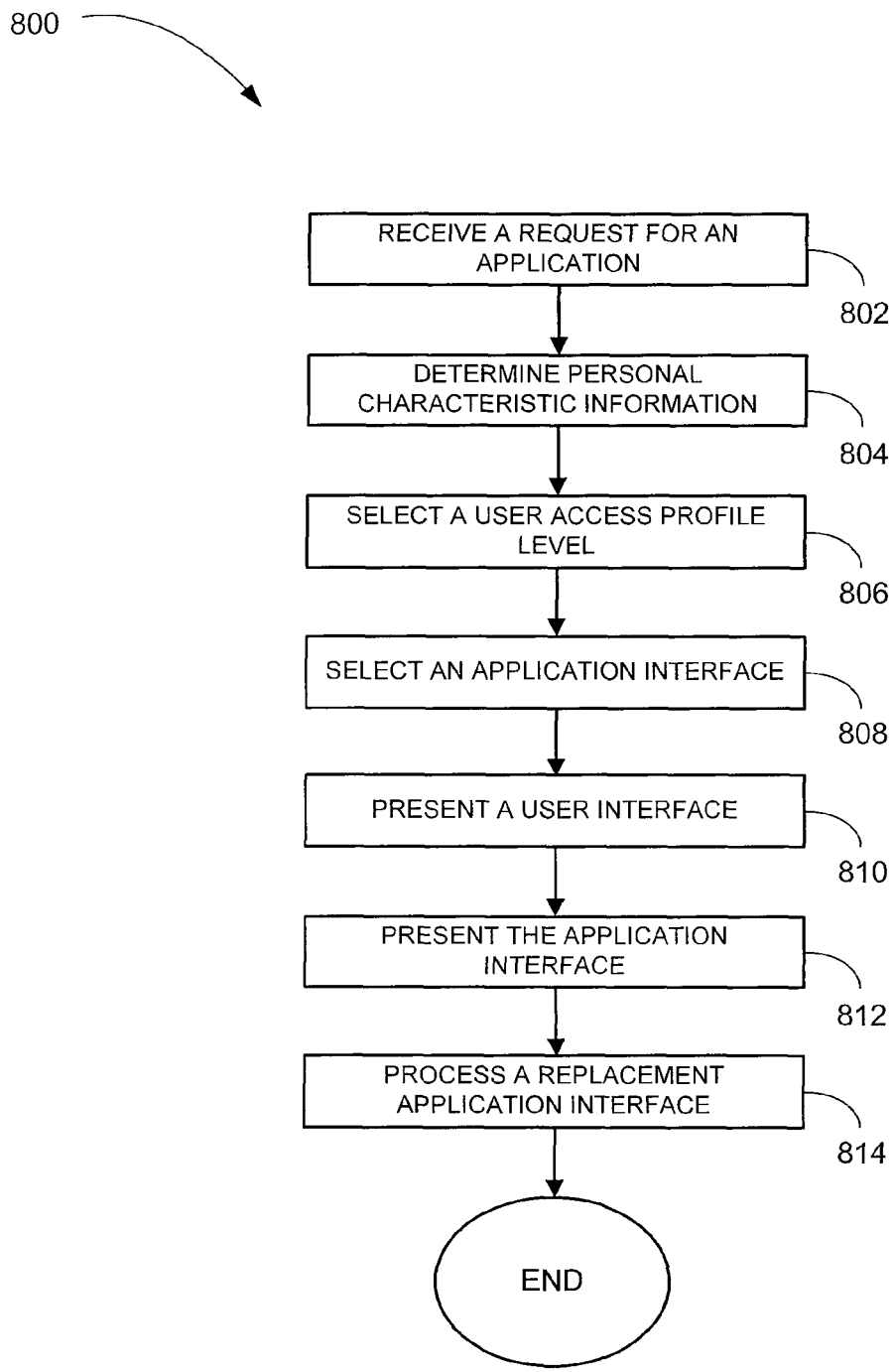
FIG. 8 is a flowchart illustrating a method for application interface presentation in accordance with an example embodiment.

FIG. 8 illustrates a method 800 for application interface presentation according to an example embodiment. The method 800 may be performed by the provider 102 and/or the access device 106 of the content system 100, 200 (see FIGS. 1 and 2) or otherwise performed.

A request for the application 112 may be received at block 802. The request may be received from the user through a user interface presented on the access device 106 or otherwise received.

The personal characteristic information 118 of a user is determined at block 804. The personal characteristic information 118 may be determined in accordance with the receiving of the request. The personal characteristic information 118 may be determined by accessing the personal characteristic information 118 of the user from the database 108, by monitoring a number of web sites visited by the user, and/or by monitoring a number of interactions received from the user.

At block 806, a user access profile level for the user is selected from among a number of available user access profile levels in accordance with the personal characteristic information 118. An application interface to the application 112 is selected in accordance with the user access profile level at block 808. A user interface may be presented to the user at block 810.

The application interface is presented to the user at block 812. The application interface may be presented to the user within the user interface or otherwise presented.

Replacement application interface processing may occur at block 814. An example embodiment of replacement application interface processing is described in greater detail below.

Figure 9:
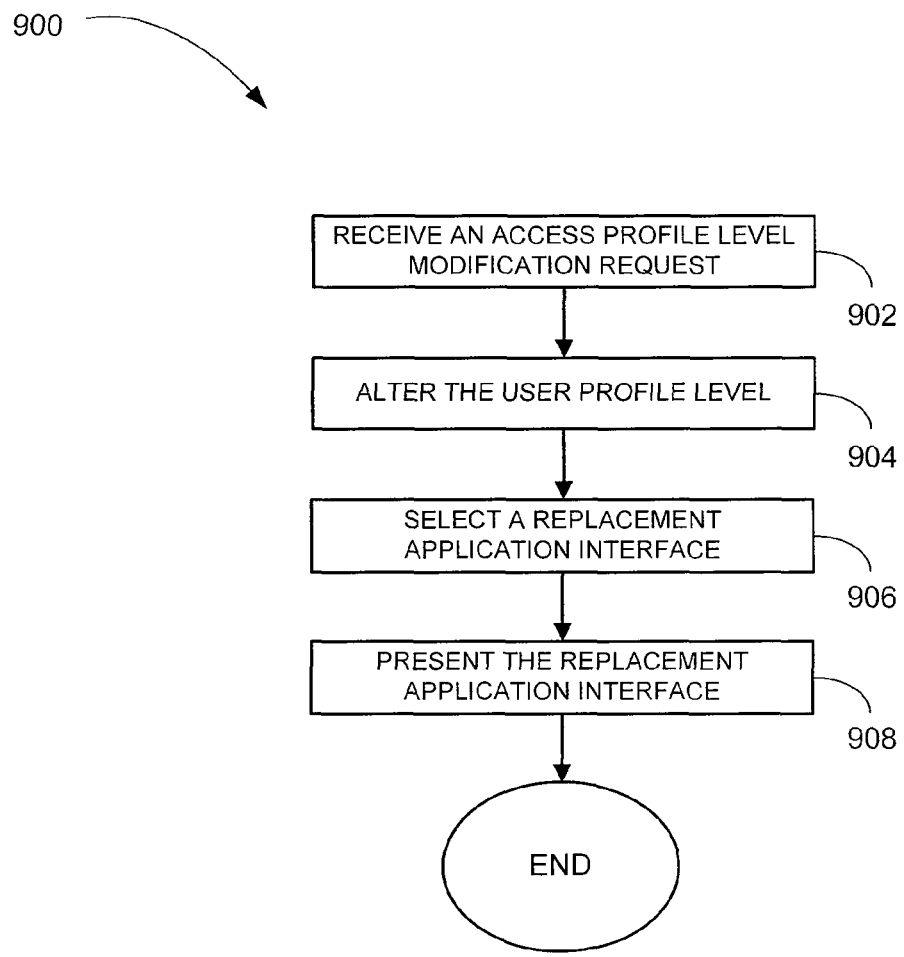
FIGS. 9 and 10 are flowcharts illustrating a method for replacement application interface processing in accordance with an example embodiment.

FIG. 9 illustrates a method 900 for replacement application interface processing according to an example embodiment. The method 900 may be performed at block 812 (see FIG. 8) or otherwise performed.

An access profile level modification request is received from the user at block 902. At block 904, the user access profile level for the user may be altered in accordance with the receiving of the access profile level modification request.

A replacement application interface to the application is selected in accordance with the altered user access profile level at block 906. The replacement application interface is presented to the user at block 908.

Figure 10:
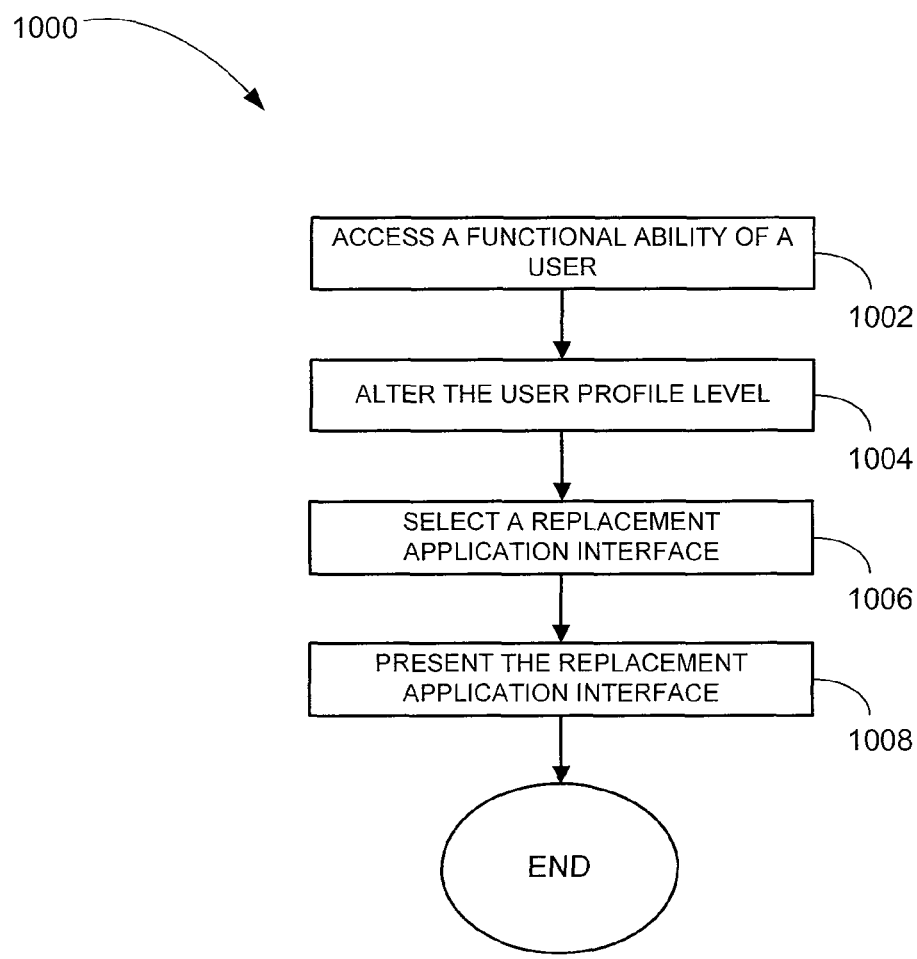

FIG. 10 illustrates a method 1000 for replacement application interface processing according to an example embodiment. The method 1000 may be performed at block 812 (see FIG. 8) or otherwise performed.

A functional ability of the user to utilize the application through the application interface is accessed at block 1002. The functional ability may include, by way of example, a speed of use of the application 112 by the user through the application interface, a comprehension of a number of features of the application 112 available to the user through the application interface, or the like.

At block 1004, the user access profile level for the user is altered in accordance with the functional ability of the user. A replacement application interface to the application 112 is selected in accordance with the altered user access profile level at block 1006. The replacement application interface is presented to the user at block 1008.

Figure 11:
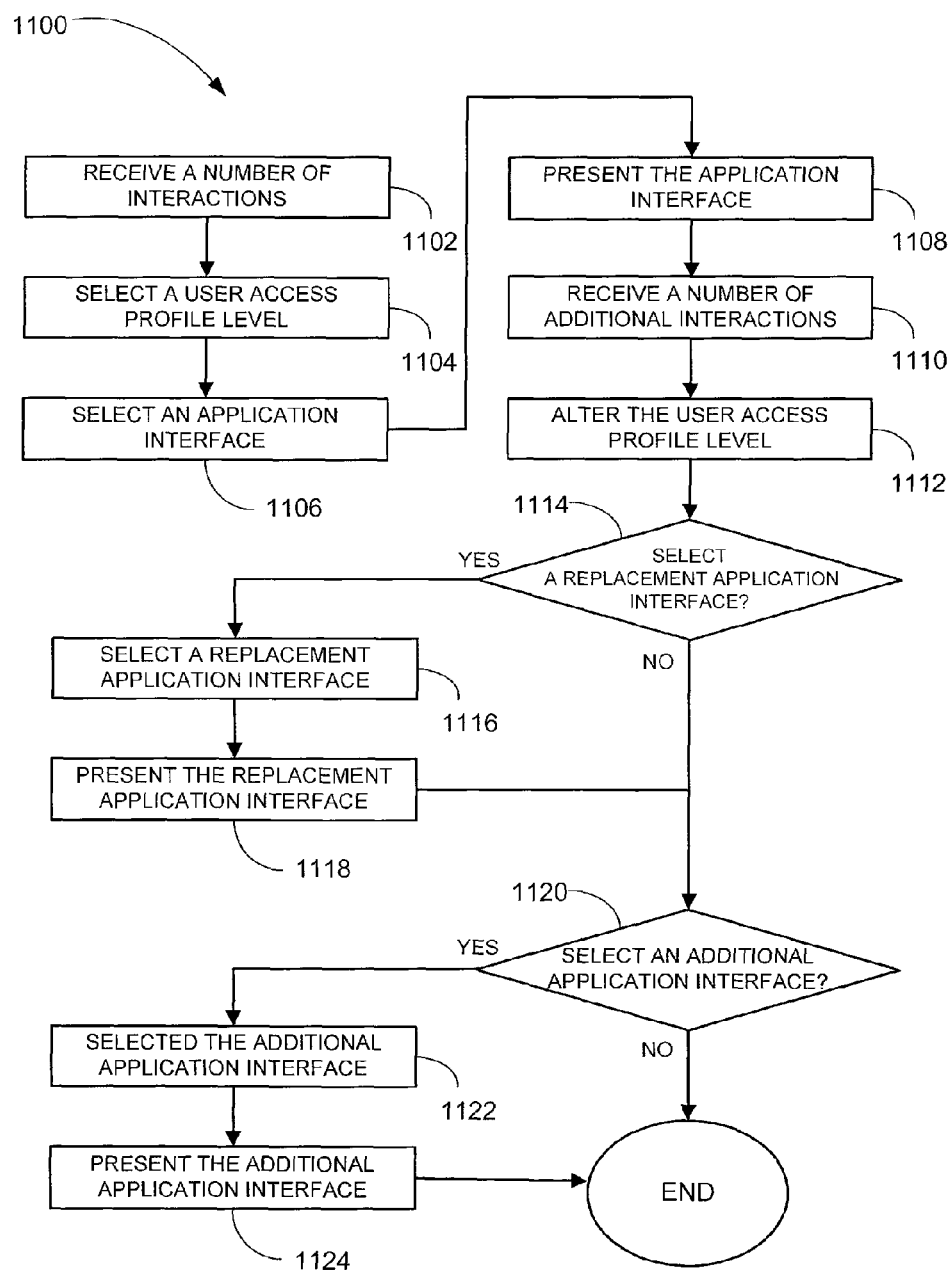
FIG. 11 is a flowchart illustrating a method for application interface presentation in accordance with an example embodiment.

FIG. 11 illustrates a method 1100 for application interface presentation according to an example embodiment. The method 1100 may be performed by the provider 102 and/or the access device 106 of the content system 100, 200 (see FIGS. 1 and 2) or otherwise performed.

At block 1102, a number of interactions received from the user is monitored to determine the personal characteristic information 118 of the user.

At block 1104, a user access profile level for the user is selected among a number of available user access profile levels in accordance with the personal characteristic information 118.

An application interface to an application is selected in accordance with the user access profile level at block 1106. The application interface is presented to the user at block 1108.

A number of additional interactions may be received from the user at block 1110. At block 1112, the user access profile level for the user may be altered in accordance with the monitoring of the number of additional interactions.

A determination may be made at decision block 1114 whether to select a replacement application interface. If a determination is made to select a replacement application interface, a replacement application interface to the application is selected in accordance with the altered user access profile level at block 1116 and the replacement application interface is presented to the user at block 1118. If a determination is made not to select a replacement application interface at decision block 1114 or upon completion of the operations at block 1118, the method 1100 may proceed to decision block 1120.

At decision block 1120, a determination may be made to select an additional application interface. If a determination is made to select the additional application interface, the additional application interface to an additional application may be selected in accordance with the altered user access profile level at block 1122 and the additional application interface may be presented to the user at block 1124. If a determination is made not to select the additional application interface at decision block 1120 or upon completion of the operations at block 1124, the method 1100 may terminate. The operations performed at decision block 1114 and decision block 1120 may occur in any order.

Figure 12:
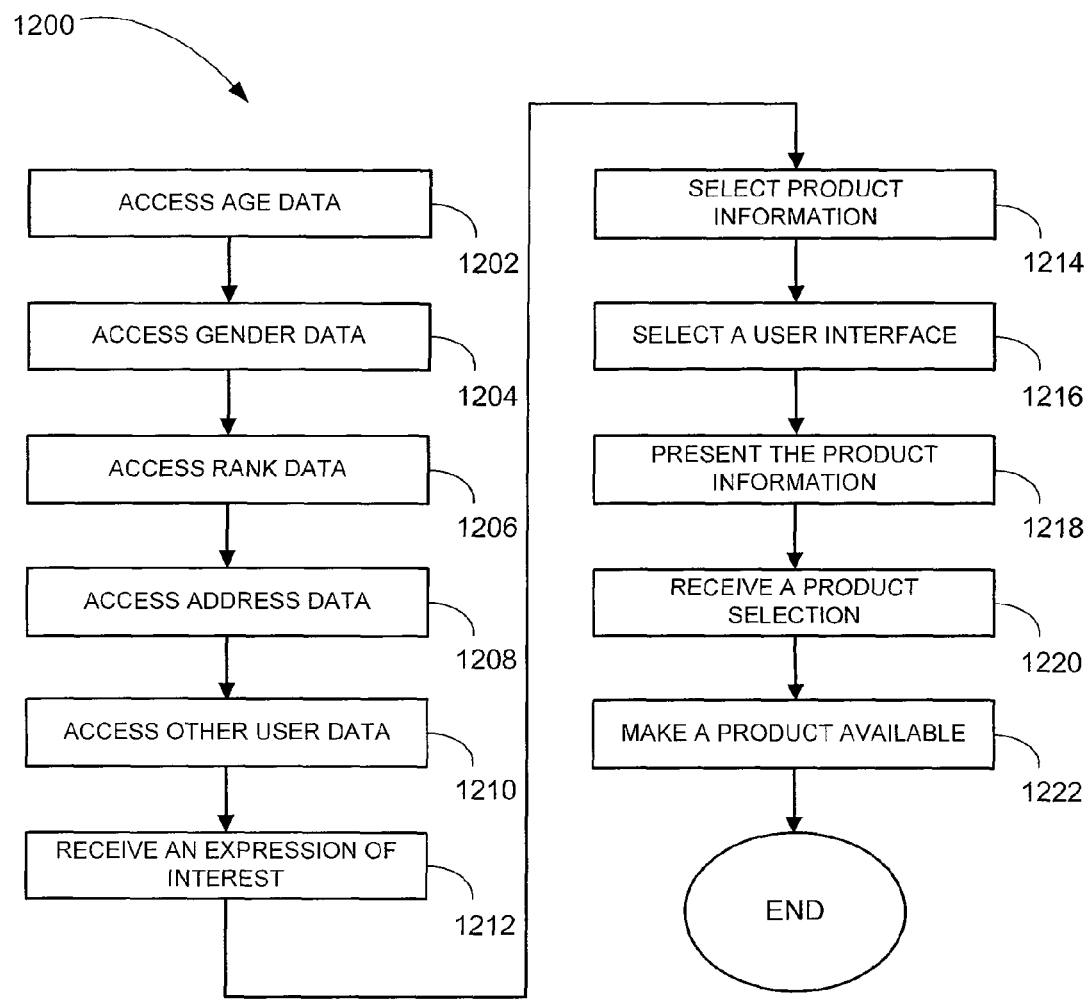
FIG. 12 is a flowchart illustrating a method for product information presentation in accordance with an example embodiment.

FIG. 12 illustrates a method 1200 for product information presentation according to an example embodiment. The method 1200 may be performed by the provider 102 and/or the access device 106 of the content system 100, 200 (see FIGS. 1 and 2) or otherwise performed.

Age data associated with a user may be accessed from the personal characteristic information 118 of the user in the database 108 at block 1202. Gender data associated with the user may be accessed from the personal characteristic information 118 of the user in the database 108 at block 1204. Rank data associated with a user may be accessed from the personal characteristic information 118 of the user in the database 108 at block 1206. Address data associated with a user may be accessed from the personal characteristic information 118 of the user in the database 108 at block 1208. Other user data may be accessed from the personal characteristic information 118 of the user in the database 108 at block 1210. An expression of product interest may be received from the user at block 1212.

At block 1214, product information is selected in accordance with the age data, the gender data, the rank data, the address data, other accessed data and/or an expression of product interest. The product information may describe a product available to the user in the system 100, 200. The product may be, by way of example, life insurance, health insurance, car insurance, a credit card, a savings account, a checking account, or the like. The product may also be associated with other types of financial aspects including, for example, financial planning, investments and trading, or retirement planning. The product may be associated with a nonfinancial aspect where people continuously use the product. Other types of products may also be selected.

At block 1216, a user interface for the user may be selected among a number of available user interfaces in accordance with the age data, the gender data, the rank data, the address data and/or other user data.

The product information may be presented to the user through the selected user interface at block 1218.

A product selection may be received from the user at block 1220. The product selection may be of the product associated with the product information. At block 1222, the product may be made available in the system to the user in accordance with the receiving of the product selection.

Figure 13:
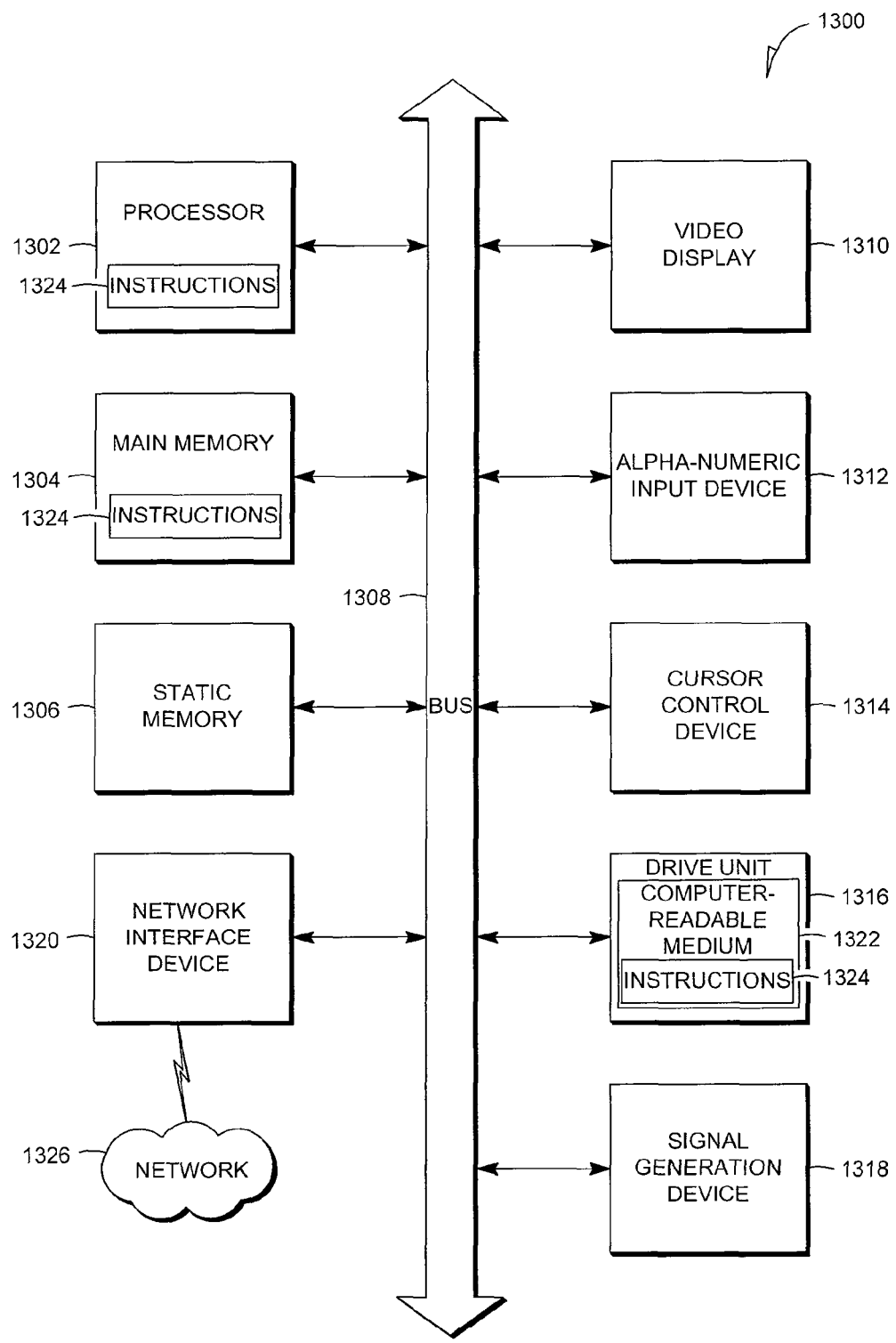
FIG. 13 illustrates a diagrammatic representation of a machine in the example form of a computer system within which a set of instructions for causing the machine to perform any one or more of the methodologies discussed herein may be executed.

FIG. 13 shows a diagrammatic representation of machine in the example form of a computer system 1300 within which a set of instructions may be executed causing the machine to perform any one or more of the methods, processes, operations, or methodologies discussed herein. The provider 102 may be deployed on the computer system 1300. The access device 106 may include the functionality of the computer system 1300.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU) a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a cursor control device 1314 (e.g., a mouse), a drive unit 1316, a signal generation device 1318 (e.g., a speaker) and a network interface device 1320.

The drive unit 1316 includes a machine-readable medium 1322 on which is stored one or more sets of instructions (e.g., software 1324) embodying any one or more of the methodologies or functions described herein. The software 1324 may also reside, completely or at least partially, within the main memory 1304 and/or within the processor 1302 during execution thereof by the computer system 1300, the main memory 1304 and the processor 1302 also constituting machine-readable media.

The software 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for interface presentation have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   determining, by a computing device having a computer processor and computer-readable code stored on a computer-readable medium and executable by the computer processor, personal characteristic information of a user;
      wherein the determining of the personal characteristic information of the user is based on a monitoring of a plurality of web sites visited by the user;
   selecting, by the computing device, a user access profile level for the user among a plurality of available user access profile levels in accordance with the personal characteristic information;
   selecting, by the computing device, an application in accordance with the user access profile level;
   notifying the user of an availability of the application;
   receiving a request from the user to access the application with a first application interface;
   receiving an access profile level modification request from the user;

assessing a functional ability of the user to utilize the application through the first application interface using a functional ability assessment subsystem;
altering the user access profile level for the user in accordance with:
the receiving of the access profile level modification request, and
the functional ability of the user to utilize the application through the first application interface;
selecting a replacement application interface to the application in accordance with the altered user access profile level;
and presenting the replacement application interface to the user.

2. The method of claim 1, further comprising:
receiving a request for the application;
wherein the determining of the personal characteristic information is in accordance with the receiving of the request.

3. The method of claim 1, wherein the determining of the personal characteristic information comprises:
monitoring a plurality of interactions received from the user to determine the personal characteristic information of the user.

4. The method of claim 3, further comprising:
monitoring a plurality of additional interactions received from the user, wherein the user access profile level for the user is altered further in accordance with the monitoring of the plurality of additional interactions.

5. The method of claim 1, wherein the functional ability of the user comprises at least one of a speed of use of the application and a comprehension of features of the application.

6. A non-transitory machine-readable storage medium comprising instructions, which when implemented by one or more processors perform the following operations:
determine personal characteristic information of a user;
wherein determining personal characteristic information of the user is based on monitoring a plurality of web sites visited by the user;
select a user access profile level for the user among a plurality of available user access profile levels in accordance with the personal characteristic information;
select an application in accordance with the user access profile level;
notify the user of an availability of the application;
receive a request from the user to access the application with a first application interface;
receive an access profile level modification request from the user;
assess a functional ability of the user to utilize the application through the first application interface using a functional ability assessment subsystem;
alter the user access profile level for the user in accordance with:
the receiving of the access profile level modification request, and
the functional ability of the user to utilize the application through the first application interface;
select a replacement application interface to the application in accordance with the altered user access profile level;
and present the replacement application interface to the user.

7. The machine-readable medium of claim 6 further comprising instructions, which when implemented by one or more processors perform the following operations:
receive a request for the application;
wherein determination of the personal characteristic information is in accordance with receipt of the request.

8. The machine-readable medium of claim 6, wherein the one or more instructions to determine the personal characteristic information include:
monitoring a plurality of interactions received from the user to determine the personal characteristic information of the user.

9. The machine-readable medium of claim 8 further comprising instructions, which when implemented by one or more processors perform the following operations:
monitoring a plurality of additional interactions received from the user, wherein the user access profile level for the user is altered further in accordance with the monitoring of the plurality of additional interactions.

10. The machine-readable medium of claim 6, wherein the functional ability of the user comprises at least one of a speed of use of the application and a comprehension of features of the application.

11. A system comprising:
a memory; and
a processor coupled to the memory, wherein the processor is configured to execute non-transitory instructions stored in the memory using:
at least one subsystem that determines personal characteristic information of a user;
wherein determining personal characteristic information of the user is based on monitoring a plurality of web sites visited by the user;
at least one subsystem that selects a user access profile level for the user among a plurality of available user access profile levels in accordance with the personal characteristic information;
at least one subsystem that selects an application in accordance with the user access profile level;
at least one subsystem that notifies the user of an availability of the application;
at least one subsystem that receives a request from the user to access the first application with a first application interface;
at least one subsystem that receives an access profile level modification request from the user;
at least one subsystem that assesses a functional ability of the user to utilize the application through the application interface;
at least one subsystem that alters the user access profile level for the user in accordance with:
the receiving of the access profile level modification request, and
the functional ability of the user to utilize the application through the first application interface;
at least one subsystem that selects a replacement application interface to the application in accordance with the altered user access profile level; and
at least one subsystem that presents the replacement application interface to the user.

12. The system of claim 11, further comprising:
at least one subsystem that receives a request for the application;
wherein determination of the personal characteristic information is in accordance with receipt of the request.

13. The system of claim 11, wherein the determining of the personal characteristic information comprises:
monitoring a plurality of interactions received from the user to determine the personal characteristic information of the user.

14. The system of claim 13, further comprising:
- at least one subsystem that monitors a plurality of additional interactions received from the user; and
- at least one subsystem that alters the user access profile level for the user in accordance with monitoring of the plurality of additional interactions,
- wherein system is further configured to select a replacement application interface to the application in accordance with the altered user access profile level and presents the replacement application interface to the user.

15. The system of claim 11, wherein the functional ability of the user comprises at least one of a speed of use of the application and a comprehension of features of the application.

* * * * *

UNITED STATES PATENT AND TRADEMARK OFFICE
CERTIFICATE OF CORRECTION

| | | |
|---|---|---|
| PATENT NO. | : 9,659,011 B1 | Page 1 of 1 |
| APPLICATION NO. | : 12/032941 | |
| DATED | : May 23, 2017 | |
| INVENTOR(S) | : Benjamin Hunter Stotts and Bradly Jay Billman | |

It is certified that error appears in the above-identified patent and that said Letters Patent is hereby corrected as shown below:

In the Specification

Under Cross References, Column 1, Line 11, reads Feb. 18, 62008 should read Feb. 18, 2008.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*